(12) United States Patent
Simpson et al.

(10) Patent No.: US 9,334,404 B2
(45) Date of Patent: May 10, 2016

(54) METHOD OF MAKING SUPERHYDROPHOBIC/SUPEROLEOPHILIC PAINTS, EPOXIES, AND COMPOSITES

(71) Applicant: UT-BATTELLE, LLC, Oak Ridge, TN (US)

(72) Inventors: John T. Simpson, Clinton, TN (US); Scott Robert Hunter, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 33 days.

(21) Appl. No.: 13/757,200

(22) Filed: Feb. 1, 2013

(65) Prior Publication Data

US 2014/0090578 A1    Apr. 3, 2014

Related U.S. Application Data (63) Continuation-in-part of application No. 13/631,212, filed on Sep. 28, 2012.

(51) Int. Cl.
| C09D 5/00 | (2006.01) |
| C09D 5/16 | (2006.01) |
| C09D 7/12 | (2006.01) |

(52) U.S. Cl.
CPC ............... *C09D 5/00* (2013.01); *C09D 5/1681* (2013.01); *C09D 7/1266* (2013.01); *C09D 7/1275* (2013.01)

(58) Field of Classification Search
CPC ...................................................... C09D 5/1681
USPC .......................................... 523/200, 212, 218
See application file for complete search history.

(56) References Cited

U.S. PATENT DOCUMENTS

| 7,150,904 B2 | 12/2006 | D'Urso et al. |
| 7,258,731 B2 | 8/2007 | D'Urso et al. |
| 7,638,182 B2 | 12/2009 | D'urso et al. |
| 7,707,854 B2 | 5/2010 | D'Urso et al. |
| 7,744,953 B2 | 6/2010 | Huang et al. |
| 7,754,279 B2 | 7/2010 | Simpson et al. |
| 8,216,674 B2 | 7/2012 | Simpson et al. |
| 2003/0013795 A1 | 1/2003 | Nun et al. |
| 2007/0184247 A1 | 8/2007 | Simpson et al. |
| 2008/0286556 A1* | 11/2008 | D'urso et al. ............. 428/315.5 |
| 2008/0296252 A1 | 12/2008 | D'Urso et al. |
| 2009/0042469 A1 | 2/2009 | Simpson |
| 2010/0021745 A1 | 1/2010 | Simpson et al. |
| 2010/0286582 A1 | 11/2010 | Simpson et al. |
| 2012/0088092 A1 | 4/2012 | Simpson et al. |

FOREIGN PATENT DOCUMENTS

| EP | 0507634 | 10/1992 |
| EP | 1479738 | 11/2004 |
| EP | 2426179 | 3/2012 |
| FR | 2852966 | 10/2004 |
| WO | 0002967 | 1/2000 |
| WO | 2006091235 | 8/2006 |
| WO | 2008085052 | 7/2008 |
| WO | 2009012116 | 1/2009 |
| WO | 2013042052 | 3/2013 |
| WO | 2013071212 | 5/2013 |

* cited by examiner

*Primary Examiner* — Vickey Nerangis
(74) *Attorney, Agent, or Firm* — Fox Rothschild LLP (57) ABSTRACT

Superhydrophobic paints and epoxies comprising superoleophilic particles and surfaces and methods of making the same are described. The superoleophilic particles can include porous particles having a hydrophobic coating layer deposited thereon. superoleophilic particles.

15 Claims, 12 Drawing Sheets

PRIOR ART

FIGURE 4B

PRIOR ART

Uncoated Reference Sample (with Barnacles)    Silicone Modified SH Coating

B

Uncoated Reference Sample (light spots are barnacles)    Silicone Modified SH Coating (light spots are water)

METHOD OF MAKING SUPERHYDROPHOBIC/SUPEROLEOPHILIC PAINTS, EPOXIES, AND COMPOSITES

CROSS-REFERENCE TO RELATED APPLICATIONS

This application is a continuation-in-part of U.S. patent application Ser. No. 13/631,212, filed on Sep. 28, 2012, the entirety of which is hereby incorporated by reference.

The following U.S. patents and U.S. patent applications are specifically referenced and incorporated herein by reference:
(i) U.S. Pat. No. 7,258,731 issued on Aug. 21, 2007 to Brian R. D'Urso, et al. entitled "Composite, Nanostructured, Super-Hydrophobic Material";
(ii) U.S. patent application Ser. No. 11/749,852 filed on May 17, 2007 by Brian D'Urso, et al. entitled "Super-Hydrophobic Water Repellant Powder";
(iii) U.S. patent application Ser. No. 11/777,486 filed on Jul. 13, 2007 (now U.S. Pat. No. 8,216,674 issued on Jul. 10, 2012) by John T. Simpson, et al. entitled "Superhydrophobic Diatomaceous Earth"; and
(iv) U.S. patent application Ser. No. 12/915,183 filed on Oct. 29, 2010 by Tolga Aytug, et al. entitled "Superhydrophobic Transparent Glass (STG) Thin Film Articles."

STATEMENT REGARDING FEDERALLY SPONSORED RESEARCH

This invention was made with government support under Contract No. DE-AC05-00OR22725 awarded by the U.S. Department of Energy. The government has certain rights in this invention.

FIELD OF THE INVENTION

This invention is drawn to superhydrophobic paints, epoxies, and composites including superoleophilic particles and surfaces, and methods of making the same.

BACKGROUND OF THE INVENTION

There are abundant uses for superhydrophobic materials, including self-cleaning surfaces, anti-fouling surfaces and anti-corrosion surfaces. Approaches for producing surfaces exhibiting these properties include producing microtextured superhydrophobic surfaces or chemically active antimicrobial surfaces. Despite the impressive properties achieved by such known surfaces, the properties are not durable and the surfaces need to be replaced or otherwise maintained frequently. Thus, research to identify alternative approaches has continued.

Adding superhydrophobic powders in paints and epoxies, without adversely affecting their water repellent properties has been problematic since such paints and epoxies typically cover any exposed powder grains nanostructure and fills-in any of the powder's pores, thereby masking the powder's superhydrophobic properties. One way to achieve such binding has been to use a solution containing a very small amount of binder as compared to the amount of superhydrophobic powder being used. The problem with this approach is that such a small amount of binder simply will not provide a well bonded, durable coating. Therefore, a need exists for a method to incorporate superhydrophobic particles into paints and epoxies. A need also exists for resilient superhydrophobic paints and epoxies.

SUMMARY OF THE INVENTION

Superoleophilic compositions, coatings and surfaces and methods of making the same are described. The superoleophilic compositions can include a plurality of superoleophilic particles. The superoleophilic particles can include porous particles that include a plurality of nanopores and a hydrophobic coating layer. At least some of the nanopores can provide flow through porosity. The coated porous particles can have particle sizes ranging from at least 100 nm to about 10 μm. Finally, the superoleophilic particles can include oil pinned within the nanopores of the porous particles.

The hydrophobic coating layer can include a perfluorinated organic material. The hydrophobic coating layer can include a self-assembled monolayer.

The porous particles can include (a) porous diatomaceous earth particles, (b) particles that have spaced apart nanostructured features comprising a contiguous, protrusive material, or (c) a mixture of both. The porous particles can also include an etching residue disposed on (e.g., coupled to) the contiguous, protrusive material. The etching residue can be from a recessive contiguous material interpenetrating with the protruding material. Either or both of the protruding material and the etching residue can be a glass.

The oil can be a non-nutritional oil. The oil can be an oil selected from the group consisting of non-volatile linear and branched alkanes, alkenes and alkynes; esters of linear and branched alkanes, alkenes and alkynes; polysiloxanes, and combinations thereof. The oil can include (i) an oil that does not evaporate at ambient environmental conditions; (ii) an oil that evaporates at ambient environmental conditions, or (iii) a mixture of both.

The compositions described herein can include superoleophilic coating solutions that include a solvent with a plurality of superoleophilic particles suspended therein. The compositions can also be superoleophilic coatings that include a binder layer, where the plurality of superoleophilic particles are coupled to and extend from the binder layer. A material that includes a substrate, a plurality of superoleophilic particles, and a binder coupling the plurality of superoleophilic particles to the substrate is also described.

A method of making superoleophilic particles that includes providing a plurality of porous particles having a hydrophobic coating layer deposited thereon, and pinning an oil within nanopores of the porous particles. The pinning step can include contacting an oil pinning solution with the porous particles. The oil pinning solution can include the oil with or without a surfactant. The surfactant can be a volatile surfactant selected from the group consisting of alcohols; acetone; linear and branched alkanes, alkenes and alkynes; and combinations thereof.

A method of forming a superoleophilic surface that includes applying a coating solution to a surface of a substrate is also described. The coating solution can include a solvent with a plurality of superoleophilic porous particles disposed therein. The coating solution can be a superoleophilic coating solution that includes 0.01-20 wt-% superoleophilic particles; 0.01-20 wt-% binder; and 60-99.98 wt-% solvent.

The method can include coating a surface of the porous particles with a hydrophobic coating layer and pinning an oil within the nanopores of the porous particles. The coating step can occur after the applying step or the applying step can occur after the coating step. Similarly, the pinning step can occur after the applying step or the applying step can occur after the pinning step. The pinning step can occur after the coating step.

Various embodiments describe compositions and methods of making compositions that are both superhydrophobic paints (and epoxies) and superoleophilic paints (and epoxies) that can be used in many applications, including applications requiring anti-corrosive, anti-biofouling, and extreme water repellent properties. Various embodiments provide a bulk superhydrophobic/superoleophilic effect, in that, if the paint's surface gets damaged or abraded (rubbed off) the underlying surface becomes a superhydrophobic (or superoleophilic) surface because the underlying surface also contains the same material composition as the original surface.

BRIEF DESCRIPTION OF THE DRAWINGS

A fuller understanding of the present invention and the features and benefits thereof will be obtained upon review of the following detailed description together with the accompanying drawings, in which:

FIGS. 9A & B: is pictures showing comparative results for radome plates and aluminum plates, respectively, with and without the inventive superoleophilic coatings after 8 weeks of exposure to the ocean;

DETAILED DESCRIPTION OF THE INVENTION

The present invention is drawn to superoleophilic particles, superoleophilic surfaces that include the superoleophilic particles, and methods of making superoleophilic particles and surfaces. In particular, the methods and materials described herein can be used to produce coated surfaces that exhibit exceptionally durable self-cleaning surfaces, anti-fouling surfaces, anti-corrosion surfaces and anti-icing surfaces.

As used herein, superoleophilic refers to a material that wets out when contacted with an oil or other non-polar composition. Thus, these superoleophilic materials are also superhydrophobic materials and will exhibit extremely high contact angles with water. For example, the contact angle of the superoleophilic surfaces described herein can be greater than 140°, greater than 150°, greater than 160°, or even greater than 170°.

Figure 1:
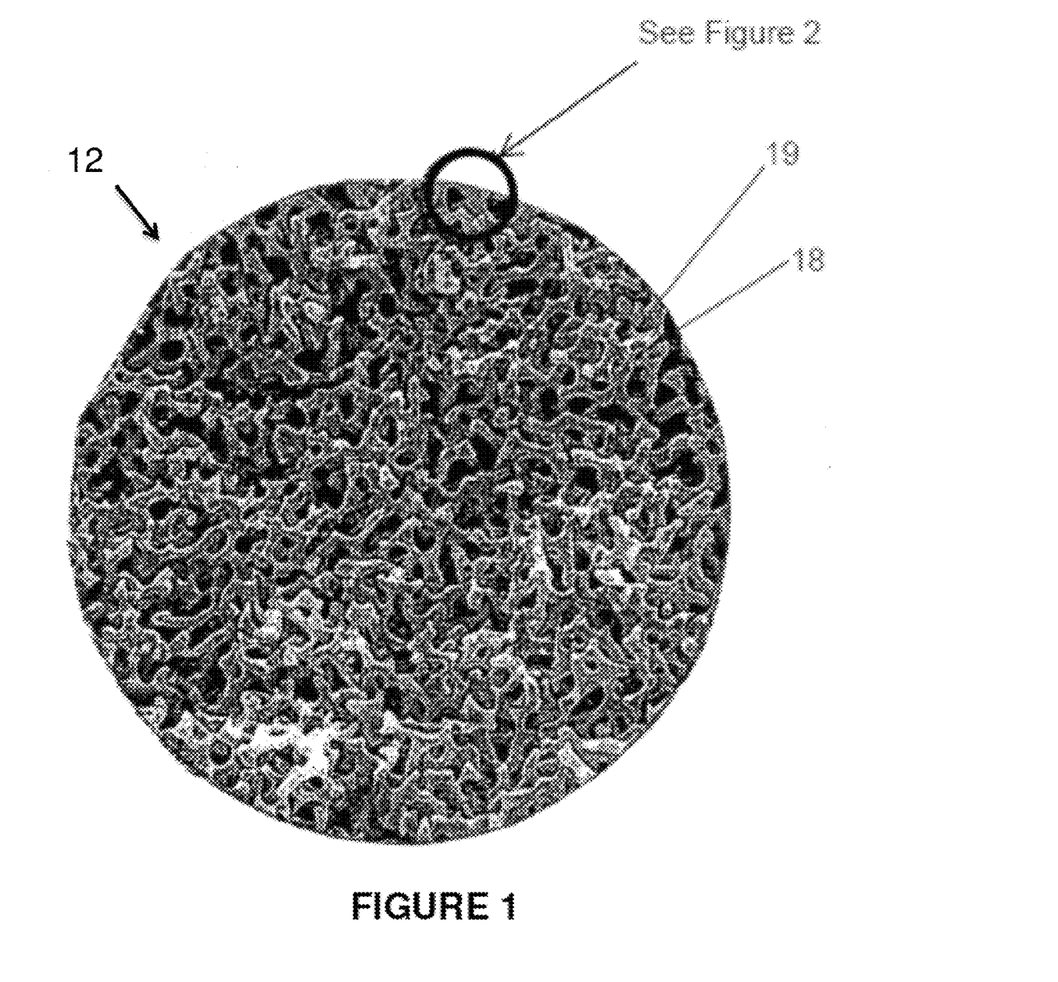
FIG. 1: is a schematic of a superoleophilic particle according to the invention produced using an SEM of a porous particle (not to scale)
Figure 2:
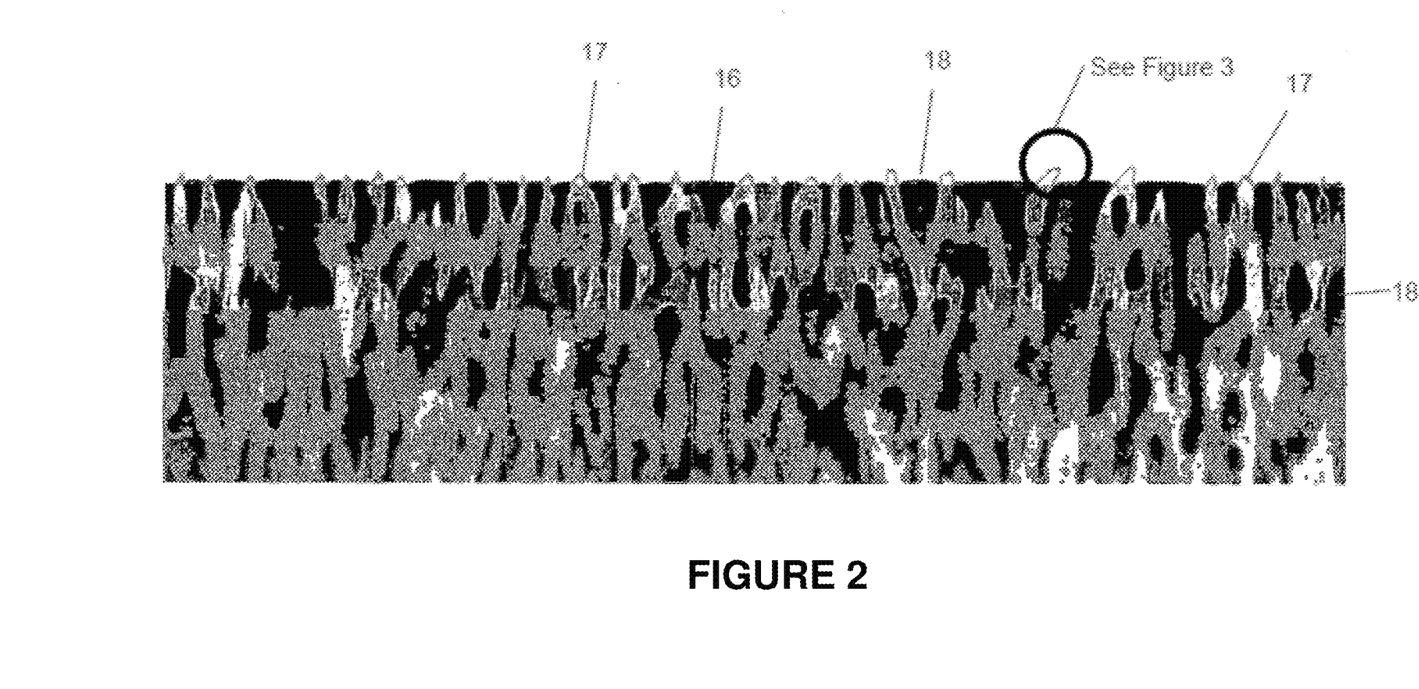
FIG. 2: is a schematic of a close up of the surface of the superoleophilic particle in FIG. 1.
Figure 3:
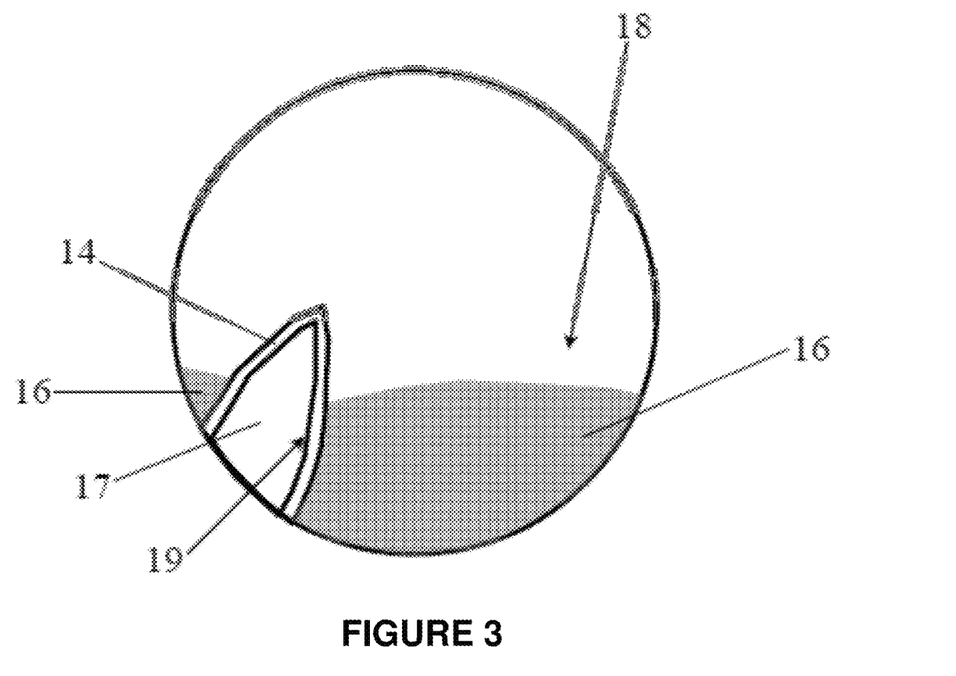
FIG. 3: is a schematic showing a close up of a hydrophobic coating on an individual nanostructured feature and the surrounding interfaces with oil pinned within a nanopore.

As shown in FIGS. 1, 2 & 3, in one aspect, the invention includes a composition comprising a plurality of superoleophilic particles 10. The superoleophilic particles 10 can include porous particles 12 having a hydrophobic coating layer 14 deposited thereon and oil 16 pinned within nanopores 18 of the porous particles 12. In particular, the oil 16 can be pinned by and/or within the surface nanopores 18 of the porous particles 12. At least some of the nanopores 18 can provide a flow through porosity.

As used herein, the term "nanopores" refers to pores with a major diameter ranging from 1 to 750 nm. Nanopores can also refer to pores having a major diameter ranging from 5 to 500 nm, or 10 to 400 nm, or any combination thereof, e.g., 400 to 750 nm.

As used herein, "pinned" refers to being held in place by surface tension forces, van der Waal forces (e.g., suction), or combinations of both. For example, the interactions that prevent a liquid from being dispensed from a laboratory pipette until the plunger is depressed could be referred to as pinning.

The porous particles 12 described herein can have a pore size ranging from 10 nm to about 10 μm, or 100 nm to 8 μm, or 500 nm to 6 μm, or 1 to 5 μm, or any combination thereof, e.g., 500 nm to 5 μm. Exemplary porous particles include diatomaceous earth and particles formed from differential etching of spinodally decomposed glass. Both types of particles are composed primarily of amorphous silicon dioxide. The materials described in the patent applications specifically referenced herein describe particularly suitable porous particles for carrying out the present invention.

Figure 4A:
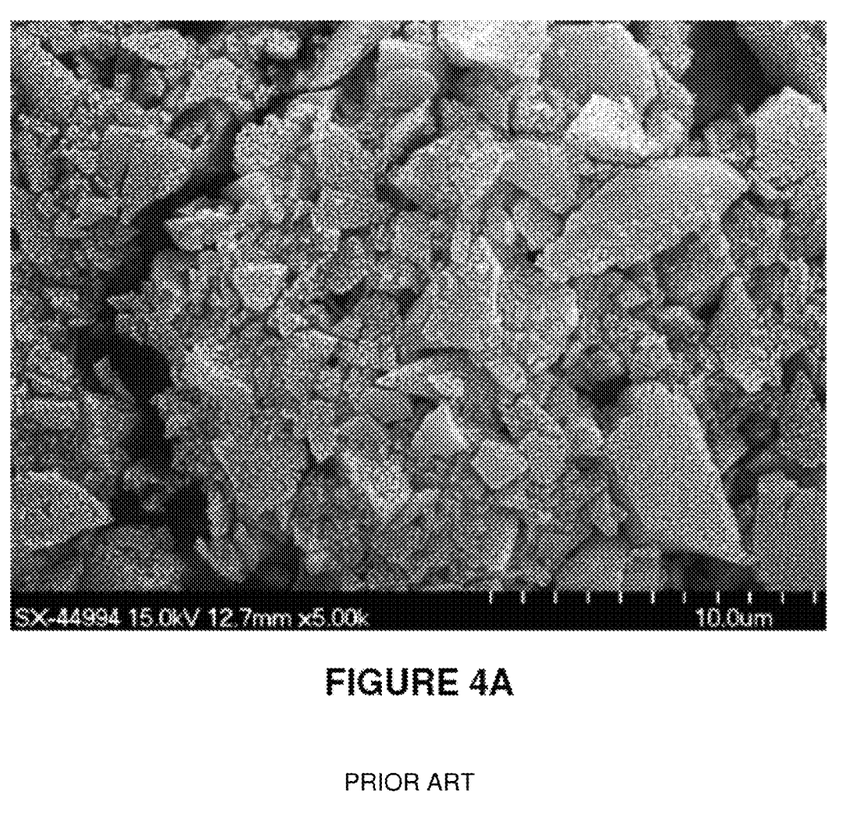
FIG. 4A: is an SEM of particles of etched, spinodally decomposed sodium borate glass.

For example, U.S. patent application Ser. No. 11/749,852 describes a plurality of solid particles characterized by particle sizes ranging from at least 100 nm to about 10 μm having a plurality of nanopores that provide flow through porosity. The surface 19 of the particles displays a plurality of spaced apart nanostructured features 17 comprising a contiguous, protrusive material. As used herein, nanostructured features 17 has its literal meaning and includes, but is not limited to, nanoscale surface roughness, nanoscale protrusions from a surface, and nanoscale branched networks, such as those present in diatomaceous earth and differentially etched spinodally decomposed glass. FIG. 4A shows an SEM image of such particles.

The porous particles also can include an etching residue disposed on the contiguous, protrusive material. As will be understood, the etching residue can result from the differential etching process utilized to remove the boron-rich phase of the spinodally decomposed borosilicate glass, which is an intermediate product of the particles described in U.S. patent application Ser. No. 11/749,852. Thus, the etching residue can include remnants of the recessive contiguous material that was interpenetrating with the protruding material in the spinodally decomposed intermediary product. The etching residue can be contiguous or non-contiguous. As will be apparent, FIGS. 1 & 2 are not to scale, but are based on SEM images of spinodally decomposed and etched porous particles and are not to scale. However, FIGS. 1 & 2 are useful to show the relevant features of the inventive superoleophilic particles.

In one exemplary porous particle, the composition of the sodium borosilicate glass that is spinodally decomposed can be 65.9 wt-% $SiO_2$, 26.3 wt-% $B_2O_3$ and 7.8 wt-% $Na_2O$. The protrusive material (e.g., silica rich phase), the recessive material (e.g., borate rich phase) or both can be glass.

Figure 4B:
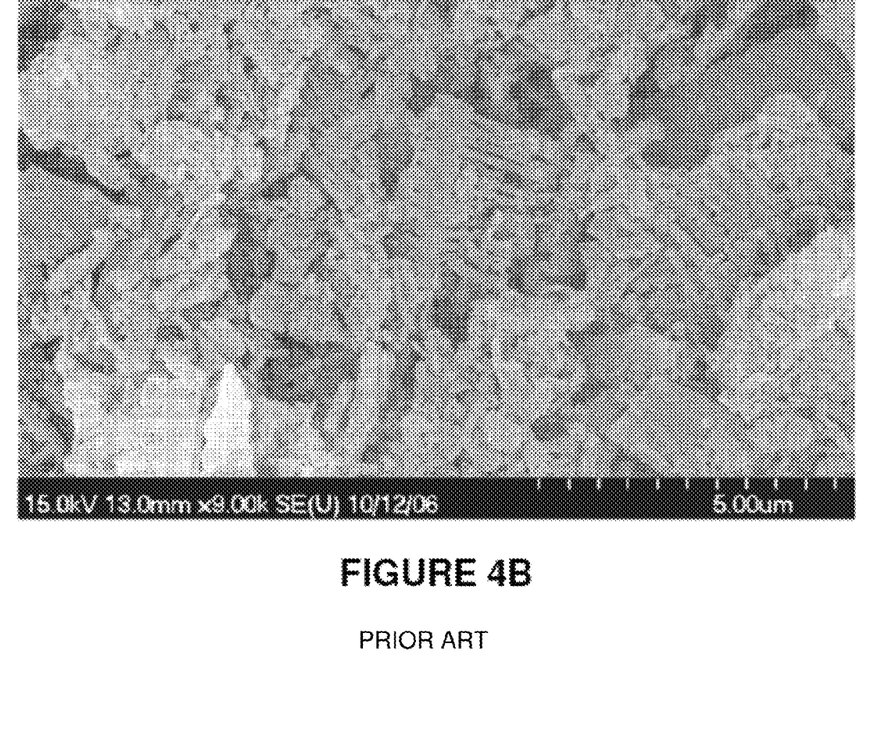
FIG. 4B: is an SEM of diatomaceous earth.

Diatomaceous earth, such as that described in U.S. patent application Ser. No. 11/777,486, can also be used as a source for porous particles with nanopores. An SEM of diatomaceous earth particles is shown in FIG. 4B. Diatomaceous earth is a chalk-like, soft, friable, earthy, very fine-grained, siliceous sedimentary rock usually light in color, although white when pure. It is very finely porous and is very low in density, such that it floats on water until its surface is wetted, and is chemically inert to most liquids and gases. It also displays low thermal conductivity and a high fusion point. Many sediments and sedimentary rocks are somewhat diatomaceous. The deposits result from an accumulation in oceans or fresh waters of the amorphous silica (opal, $SiO_2.nH_2O$) cell walls of dead diatoms that are microscopic single-cell aquatic plants (algae). The fossilized skeletal remains—a pair of symmetrical shells (frustules)—vary in size from less than 1 micron to more than 1 millimeter but are typically 10 to 200 microns across. Upon milling the diatom frustules are broken into smaller grain sizes, such as from 10 nm to 1 microns. The frustules have a broad variety of delicate, lacy, perforated shapes from discs and balls to ladders, feathers, and needles, which provide the partitioned surface of the DE that provides the surface topography conducive to the producing superhydrophobic properties when the surface is properly treated in a manner that retains the surface topography but renders the surface hydrophobic. The typical chemical composition of diatomaceous earth is about 86% silica, 5% sodium, 3% magnesium and 2% iron.

The porous diatomaceous earth (DE) particles can be processed porous particles with little or no organic contamination and where the particles retain the surface topography and silicate surface functionalities of natural DE. The surface topography of natural DE is highly partitioned with ridges and peaks extending outward from the particle. The silicate surface is that of amorphous silica where numerous silanol, Si—OH, groups exist as surface terminal groups of the silicate network. When the organic contaminate level of the DE is very low, as with some food grade DE, a heat treatment does not have to be carried out to remove organic contaminants. However, a heat treatment can be carried out to assure that organic impurities and water are substantially removed.

DE treated in excess of 650° C. can undergo material and structural changes which are deleterious to the silicate surface functionality to which the hydrophobic coating of the present invention is ultimately bound and at slightly higher temperatures is deleterious to the highly partitioned surface topography that enables superhydrophobic character when coated with a hydrophobic material. The surface of uncalcined DE is that of amorphous silica, more similar in composition to that of precipitated silica rather than pyrogenic silica. There is a reasonably high silanol content to the DE surface that can be characterized as having strong hydrogen bonded silanols, moderate strength hydrogen bonded silanols and weak hydrogen bonded silanols. Upon warming nearly all strongly hydrogen bonded silanols are broken when 650° C. is reached or exceeded. In addition, moderate strength hydrogen bonded silanols are broken when 1,000° C. is reached and above 1,000° C. the weak hydrogen bonded silanols are broken.

For the porous particles described herein, it is desirable that although surface bound water is reduced to a low level or completely removed, the presence of at least some moderate strength hydrogen bonded silanols is intended to provide sufficient sites for bonding of the coating layer and thereby stabilizing the hydrophobic self-assembled monolayer (SAM) coating. For this reason, uncalcined DE is generally the preferred form of DE for use as the porous particles described herein. The desirable surface topography formed by the diatoms and the presence of the silanol functionality at the surface can also be useful for depositing a continuous self-assembled monolayer (SAM).

In general, the uncalcined DE that is particularly useful can be treated by heating to temperatures of about 450 to about 700° C., preferably 500 to 600° C., under a dry gas stream or under vacuum prior to applying the hydrophobic coating to the surface. FIG. 4 shows a SEM image of a collection of DE particles as used in the invention. As can be seen in FIG. 4, where the distance between marks on the scale is 500 nm, the crushed DE displays particles where the cross-section is less than 3 μm and the average cross-section is less than 1 μm. These nanoparticles have irregular features with a partitioning of the surface to features of about 100 nm in width and less.

The temperature and time of heating useful for removing excess water depends on the condition of the DE as received and the structure of the hydrophobic coating composition and protocol employed. The heat treatment removes organic impurities that can interfere with the deposition of a hydrophobic layer. The heat treatment also removes water from the surface to an extent that the partitioned features of the DE topography are not significantly filled with water. Presence of the water in the voids between the DE features can prevent hydrophobic coatings from conforming to the silicate surface topography displayed by the natural-grade DE, which provides the partitioned features of that topography that caused the coated DE to exhibit superhydrophobic surface properties. Small amounts of water can be present for practice of the invention as long as the water does not interfere with the hydrophobic coating material conforming to the DE surface.

The different forms of porous particles described herein and in the respective specifically referenced patent applications can be used alone or in combination with each other. In addition, other porous particles with similar properties and morphologies can also be utilized alone or in combination as long as superoleophilic properties are exhibited by the final product.

As described in the referenced patent applications, the porous particles 12 are superhydrophobic only after a hydrophobic coating layer 14 is applied thereto. Prior to such application, the uncoated porous particles are hydrophilic. The hydrophobic coating layer 14 can be a perfluorinated organic material, a self-assembled monolayer, or both. Methods and materials for applying the hydrophobic coating 14, whether as a self-assembled monolayer or not, are fully described in the U.S. patent applications referenced hereinabove.

As shown in FIG. 3, the hydrophobic coating 14 will generally continuously coat the porous particle surface. The surface can be formed as a self assembled monolayer. Self assembled monolayers (SAMs) are surfaces consisting of a single layer of molecules on a substrate where the molecule are arranged in a manner where a head group is directed or adhered to a surface, generally by the formation of at least one covalent bond, and a tail group is directed to the air interface to provide desired surface properties, such as hydrophobicity. As the hydrophobic tail group has the lower surface energy it dominates the air surface providing a continuous surface of the tail groups.

Although SAM methods are described, it will be understood that alternate surface treatment techniques can be used. Exemplary surface treatment techniques include, but are not limited to, SAM, chemical vapor deposition, molecular beam epitaxy and surface sol-gel techniques.

SAMs useful in the instant invention can be prepared by adding a melt or solution of the desired SAM precursor onto the substrate surface where a sufficient concentration of SAM precursor is present to produce a continuous conformal monolayer. After the hydrophobic SAM is formed and fixed to the surface of the porous particle, any excess precursor can be removed as a volatile or by washing. In this manner the SAM-air interface can be primarily or exclusively dominated by the hydrophobic moiety.

One example of a SAM precursor that can be useful for the compositions and methods described herein is tridecafluoro-1,1,2,2-tetrahydroctyltriclorosilane. This molecule undergoes condensation with the silanol groups of the porous particle surface, which releases HCl and covalently bonds the tridecafluoro-1,1,2,2-tetrahydroctylsilyls group to the silanols at the surface of the porous particle. The tridecafluorohexyl moiety of the tridecafluoro-1,1,2,2-tetrahydroctylsilyl groups attached to the surface of the porous particle provides a monomolecular layer that has a hydrophobicity similar to polytetrafluoroethylene. Thus, such SAMs make it possible to produce porous particles that have hydrophobic surfaces while retaining the desired nanostructured morphology that produce the desired superhydrophobic porous particles that are the basis of the superoleophilic oil-filled particles described herein.

A non-exclusive list of exemplary SAM precursors that can be used for various embodiments of the invention is:

where y=1 to 3; X is Cl, Br, I, H, HO, R'HN, R'$_2$N, imidizolo, R'C(O)N(H), R'C(O)N(R"), R'O, F$_3$CC(O)N(H), F$_3$CC(O)N(CH$_3$), or F$_3$S(O)$_2$O, where R' is a straight or branched chain hydrocarbon of 1 to 4 carbons and R" is methyl or ethyl; L, a linking group, is CH$_2$CH$_2$, CH$_2$CH$_2$CH$_2$, CH$_2$CH$_2$O, CH$_2$CH$_2$CH$_2$O, CH$_2$CH$_2$C(O), CH$_2$CH$_2$CH$_2$C(O), CH$_2$CH$_2$OCH$_2$, CH$_2$CH$_2$CH$_2$OCH$_2$; and R is (CF$_2$)$_n$CF$_3$ or (CF(CF$_3$)OCF$_2$)$_n$CF$_2$CF$_3$, where n is 0 to 24. Preferred SAM precursors have y=3 and are commonly referred to as silane coupling agents. These SAM precursors can attach to multiple OH groups on the DE surface and can link together with the consumption of water, either residual on the surface, formed by condensation with the surface, or added before, during or after the deposition of the SAM precursor. All SAM precursors yield a most thermodynamically stable structure where the hydrophobic moiety of the molecule is extended from the surface and establish normal conformational populations which permit the hydrophobic moiety of the SAM to dominate the air interface. In general, the hydrophobicity of the SAM surface increases with the value of n for the hydrophobic moiety, although in most cases sufficiently high hydrophobic properties are achieved when n is about 4 or greater where the SAM air interface is dominated by the hydrophobic moiety. The precursor can be a single molecule or a mixture of molecules with different values of n for the perfluorinated moiety. When the precursor is a mixture of molecules it is preferable that the molecular weight distribution is narrow, typically a Poisson distribution or a more narrow distribution.

The SAM precursor can have a non-fluorinated hydrophobic moiety as long as it readily conforms to the highly nanostructured surface of the porous particle and exhibits a sufficiently low surface energy to exhibit the desired hydrophobic properties. Although the fluorinated SAM precursors indicated above are preferred, in some embodiments of the invention silicones and hydrocarbon equivalents for the R groups of the fluorinated SAM precursors above can be used. Additional details regarding SAM precursors and methodologies can be found in the patent applications that have been incorporated herein by reference.

As used herein, "oil" is intended to refer to a non-polar fluid that is a stable, non-volatile, liquid at room temperature, e.g., 23-28° C. The oils used herein should be incompressible and have no solubility or only trace solubility in water, e.g., a solubility of 0.01 g/l or 0.001 g/l or less. Exemplary oils include non-volatile linear and branched alkanes, alkenes and alkynes, esters of linear and branched alkanes, alkenes and alkynes; polysiloxanes, and combinations thereof.

The oil 16 pinned by and/or within the nanopores 18 can be a non-nutritional oil. As used herein, the term "non-nutritional" is used to refer to oils that are not consumed as a nutrient source by microbes, e.g., bacteria, fungus, etc., or other living organisms. Exemplary non-nutritional oils include, but are not limited to polysiloxanes.

It has now been discovered that the superoleophilic particles and surfaces described herein maintain their superhydrophobic properties much longer than equivalent particles and surface coatings that do not include the pinned oil described herein. Although not necessary for practicing the invention, the following discussion is believed to provide useful insight into the mechanism of the unexpectedly superior durability of the inventive superoleophilic particles and coatings. Water is one of the most powerful and destructive compounds on Earth, especially when a surface is exposed to water in the external environment. Thus, over time, water can break the surface features of the prior art particles and find a path into or around the prior art particles.

Having made the discovery described herein, one possible explanation to the limited duration of the properties of the prior art particles is that air pinned in the prior art particles is displaced by water over time. In contrast, it is now believed that when oil is pinned within nanopores of the particles, there are two major improvements over the prior art. First, the oil has a higher surface tension and density, so it becomes nearly impossible for water to displace the oil (i.e., it is easier for water to displace air than oil) that is pinned in the nanopores of the porous particles. In addition, the incompressible oil provides support for and reduce the stress on the nanoscale features that help provide the superhydrophobic properties of the particles.

For example, where oil is present in the nanopores of the porous particles, the oil absorbs some of the forces exerted of the nanofeatures by waves, raindrops, particles carried by the wind, etc. This reduces the force absorbed by, and the stress/strain exerted on, the nanofeatures, which minimizes or prevents the flexing of the nanofeatures that may ultimately break the nanofeatures. Thus, it has been unexpectedly discovered that the presence of oil pinned in the nanopores of porous particles produces superhydrophobic particles and surfaces with an exceptionally durable superhydrophobic, anti-corrosive and anti-fouling properties.

The oil can be pinned in all or substantially all of the nanopores and/or surface nanopores of the porous particles. For example, oil can be pinned in at least 70%, at least 80%, at least 90%, at least 95%, at least 97.5%, or at least 99% of the nanopores and/or surface nanopores of a superoleophilic particle described herein. The oil pinned within a single particle can be a contiguous oil phase. Alternately, the superoleophilic particles described herein can include an inner air phase that is completely surrounded by an oil phase.

In order to maintain the superoleophilic properties for an extended duration, it can be desirable that the oil pinned in the superoleophilic particles does not evaporate when the superoleophilic properties are exposed to the use environment. For example, the oil can be an oil that does not evaporate at ambient environmental conditions. An exemplary oil can have a boiling point of at least 120° C., or at least 135° C., or at least 150° C. or at least 175° C.

In some embodiments, it is advantageous to form a coating solution containing superoleophilic particles, where the pinned oil evaporates after the coating is formed. For example, the oil can be an oil that evaporates when exposed to ambient environmental conditions. An exemplary oil can have a boiling point boiling point of 135° C. or less, or 120° C. or less, or 100° C. or less, or 80° C. or less.

As used herein, "ambient environmental conditions" refer generally to naturally occurring terrestrial or aquatic conditions to which superoleophilic materials may be exposed. For example, submerged in lakes, rivers and oceans around the world, and adhered to manmade structures around the world. Exemplary ambient environmental conditions include (i) a temperature range from −40° C. to 45° C. at a pressure of one atmosphere, and (ii) standard temperature and pressure.

Figure 5:
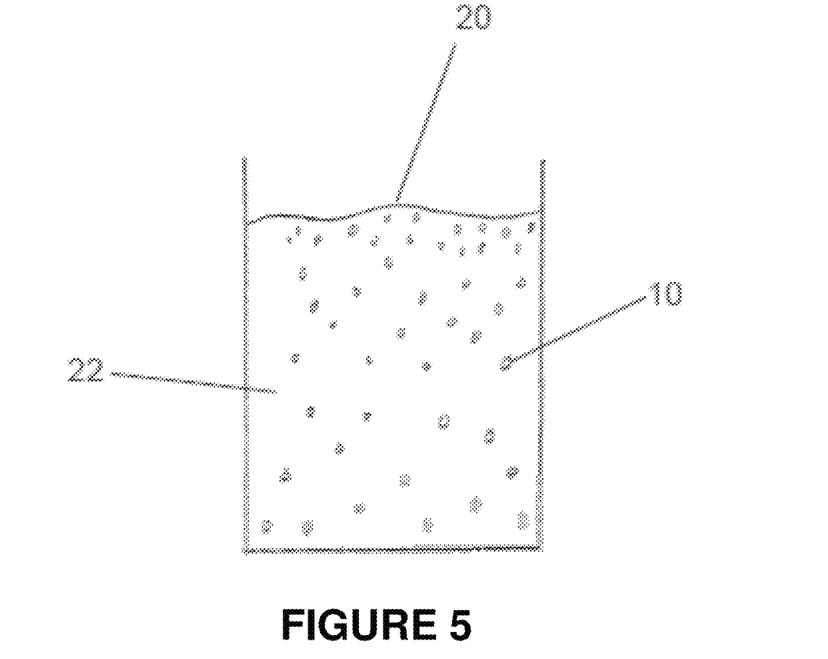
FIG. 5: is a schematic showing a coating solution.
Figure 6:
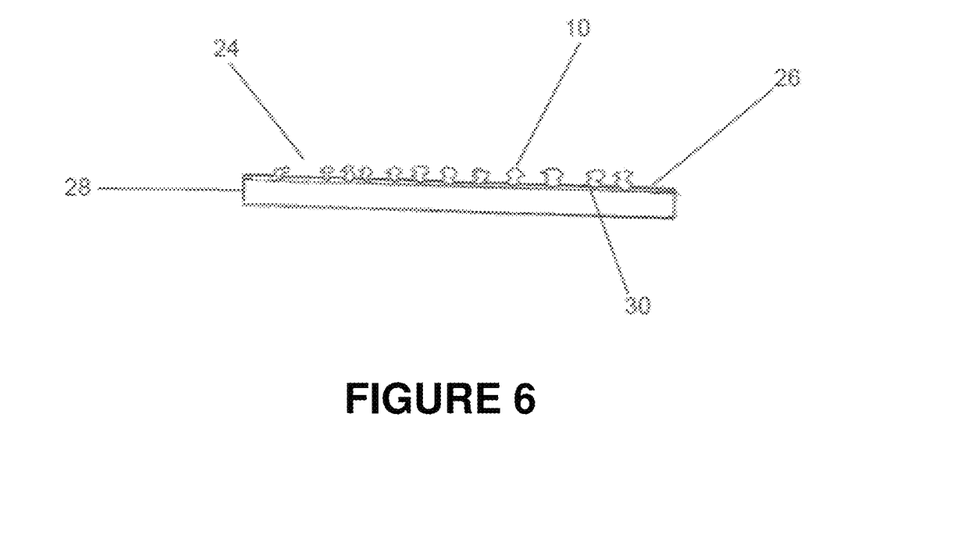
FIG. 6: is a schematic showing a surface with a superoleophilic coating disposed thereon.

As shown in FIG. 5, the composition described herein can be a superoleophilic coating solution 20 that includes superoleophilic particles 10, a solvent 22 and a binder 24. The superoleophilic particles 10 can be 0.01 to 20 wt-% of the solution, 0.05 to 10 wt-% of the solution or 0.1-5 wt-% of the solution. The binder 24 can be 0.01 to 20 wt-% of the solution, 0.05 to 10 wt-% of the solution or 0.1-5 wt-% of the solution. The solvent 22 can be 99.98 to 60 wt-% of the solution, or 99.9 to 80 wt-% of the solution, or 99.8 to 90 wt-% of the solution.

In some examples, the binder can be dissolved in the solvent 22 or in the form of binder particles, e.g., those formed by suspension polymerization, suspended in the solvent 22. FIG. 5 depicts an embodiment where the binder is dissolved in the solvent 22 so the binder is not expressly shown in the figure.

Binders useful for the compositions and methods described herein can be any material capable of durably coupling the superoleophilic particles described herein to a substrate material. Exemplary binders include, but are not limited to, polyurethanes, poly(vinyl chloride), cement, epoxies and combinations thereof.

Solvent useful for the compositions and methods described herein can be any volatile solvent useful for suspending the superoleophilic particles and suspending or solubilizing the binders described herein. The volatile solvents can be volatile at room temperature. Thus, when the superoleophilic coating solution is applied to a substrate, the solvent evaporates, which causes the solvent and binder to concentrate at an interface between the superoleophilic particles and the substrate surface. This mechanism prevents the binder from covering the nanostructured features of the particles that are largely responsible for the unique, durable superoleophilic properties.

Exemplary solvents include volatile alcohols, e.g., methanol, ethanol, etc.; acetone; volatile linear and branched alkanes, alkenes and alkynes, e.g., hexane, heptanes and octane; and combinations thereof. As used herein, volatile refers to fluids that evaporate rapidly at room temperature. For example, a fluid that evaporates in less than 5 minutes when spread across a surface as a thin sheet The invention can also be a superoleophilic coating 24 that includes a binder layer 26, where a plurality of superoleophilic particles 10 are coupled to and extend from the binder layer 26. The binder layer 26 can be continuous or discontinuous and can couple, affix and/or permanently attach the superoleophilic particles 10 to a substrate 28. A sufficient portion of the superoleophilic particles 10 can extend from the binder layer 26 that the superoleophilic properties of the particles 10 are also exhibited by the superoleophilic coating 24. Similarly, the superoleophilic particles 10 can be present in a sufficient amount and distribution that the coating 24 exhibits superoleophilic properties. The superoleophilic coating 24 can exhibit superoleophilic properties, such as a contact angle greater than 150°, for an extended duration when exposed to the environment.

Figure 10:
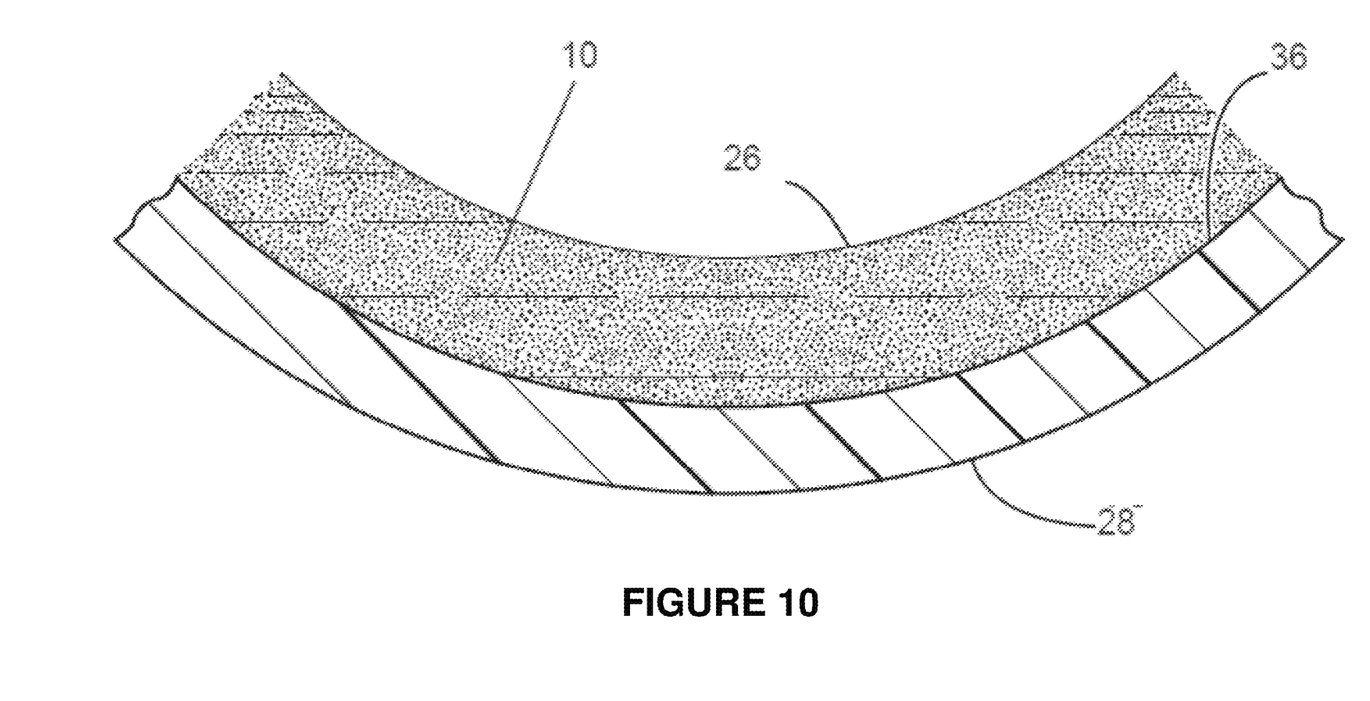
FIG. 10: is a schematic showing a surface with a superoleophilic coating disposed thereon, where at least some superoleophilic particles are embedded and/or encapsulated within the binder layer.

As shown in FIG. 10, the binder layer 26 can include some embedded superoleophilic particles 10 embedded and/or encapsulated therein 26. In such instances, the encapsulated superoleophilic particles 10 can be essentially inert unless and until a crack forms in the binder layer 26. If a crack forms, the previously embedded superoleophilic particles 10 may become exposed to create a superoleophilic fissure surface that can prevent water from penetrating through the crack to a surface 36 of the underlying substrate 28, e.g., aluminum. This mechanism further enhances the anti-corrosive properties of the coating 24 and the durability of the anti-corrosive properties.

A method of making superoleophilic particles is also described. The method can include providing a plurality of porous particles and pinning an oil within nanopores of the porous particles. Oil can be pinned within the nanopores by contacting an oil pinning solution with the porous particles. The oil pinning solution can include the oil, a surfactant, or both.

Exemplary surfactants include volatile alcohols, e.g., methanol, ethanol, etc.; acetone; volatile linear and branched alkanes, alkenes and alkynes, e.g., hexane, heptanes and octane; and combinations thereof. Many compositions described as useful as solvents herein are also useful as surfactants.

The oil being pinned should be miscible in the surfactant and the surfactant should have a viscosity that is substantially lower than that of the oil. Because high viscosity fluids, such as the relevant non-volatile oils, cannot penetrate into nanopores, a critical feature of the surfactants is reduction of the effective viscosity of the oil pinning solution to a range that can penetrate the nanopores. Once the oil pinning solution penetrates the pores, the surfactant volatizes leaving the oil pined within the nanopores.

In general, the ratio of oil to surfactant should be such that the viscosity of the oil pinning solution is sufficiently low to penetrate into the nanopores of the porous particles. The oil can be 0.01 to 100 wt-% of the oil pinning solution, 0.01 to 20 wt-% of the oil pinning solution, 0.05 to 10 wt-% of the oil pinning solution or 0.1-5 wt-% of the oil pinning solution. Where the surfactant is present, the surfactant can be 99.99 to 80 wt-% of the oil pinning solution, or 99.95 to 90 wt-% of the oil pinning solution, or 99.99 to 95 wt-% of the oil pinning solution.

The invention is also drawn to a method of forming a superoleophilic coating 24. The method can include applying a coating solution to a surface 30 of a substrate 28. The coating solution can include a solvent 22 with a plurality of porous or superoleophilic particles 12 or 10 disposed therein. The method can also include coating a surface 19 of the porous particles 12 with a hydrophobic coating layer 14 and pinning oil 16 within the nanopores 18 of the porous particles 12.

Deposition of the hydrophobic coating layer 14 and the oil pinning step can occur before or after the coating solution is applied to the surface 30 of the substrate 28. The hydrophobic coating layer 14 can be coated onto the porous particles 12 prior to the pinning step.

The coating solution can also include a binder. The coating solution can be a superoleophilic coating solution that includes 0.01-20 wt-% superoleophilic particles; 0.01-20 wt-% binder; and 60-99.98 wt-% solvent. Alternately, the coating solution can include 0.01-20 wt-% porous particles (i.e., without the pinned oil and either with or without the superhydrophobic coating); 0.01-20 wt-% binder; and 60-99.98 wt-% solvent. The coating solution can include any of the other ratios described herein with the particles being superoleophilic, superhydrophobic or hydrophilic.

Taking this pinning effect further allows us to create a bulk superhydrophobic coating material. If an oil, a solvent, an alcohol, and/or a surfactant is pinned within a superhydrophobic powder, the powder grain pores can become saturated with the solvent. The outermost part of the powder grains can be allowed to dry. Some of the surfactant can be allowed to evaporate. The surfactant pinned in the pores can take considerably longer to evaporate, due to the pinning effect. The saturated powder grains can then added to a fast drying paint or epoxy. The paint or epoxy will partially bond to the nano-patterned superhydrophobic powder grain without filling-in the nano-patterned superhydrophobic powder grain and without completely covering the powder grain's outer surface. The result is a paint or epoxy (when dry or cured) with bulk superhydrophobic behavior. Not only is the outer painted surface superhydrophobic, but if the outer surfaces gets abraded (rubbed off), the newly exposed surfaces is also superhydrophobic. This technique of filling the superhydrophobic powder with a solvent, adding it to a paint (or epoxy) and letting the paint (or epoxy) dry, then having the solvent evaporate away (after the paint or epoxy is no longer flowing), allows the use of a standard paint (or epoxy) material to become fully (inside and out) superhydrophobic.

Figure 11:
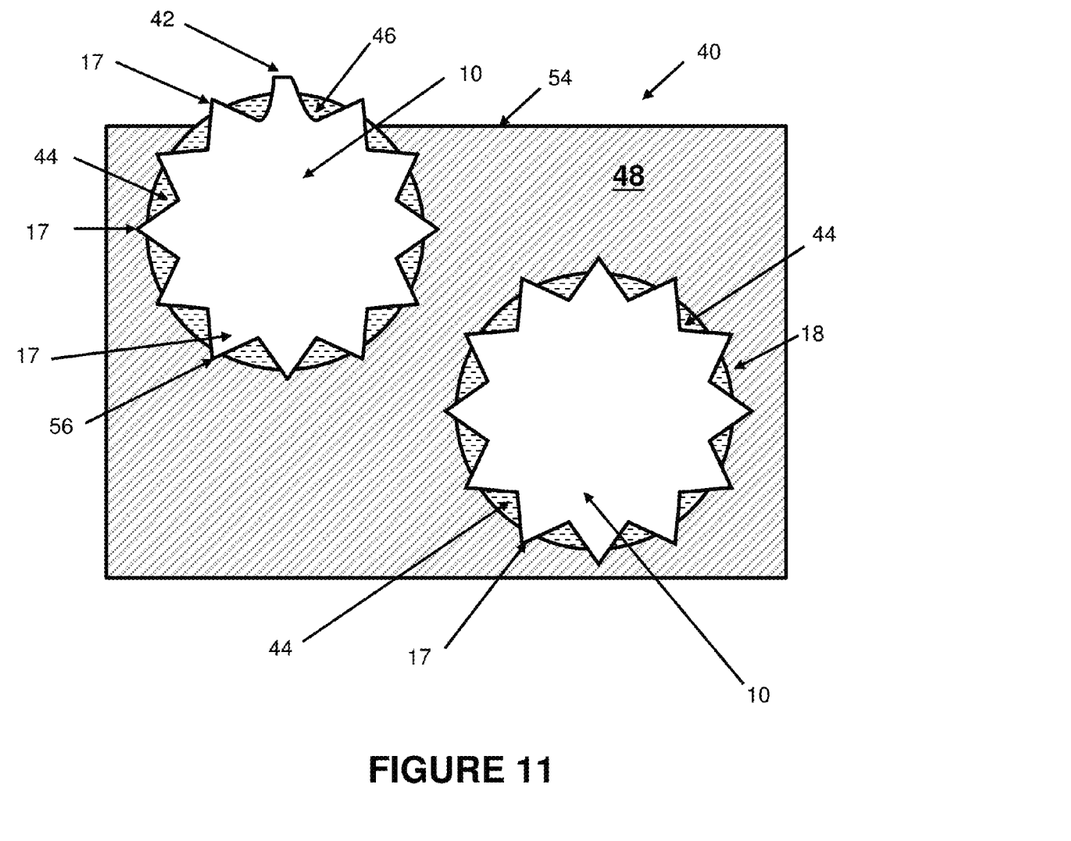
FIG. 11: is a schematic diagram showing a superhydrophobic paint that includes a plurality of superhydrophobic/superoleophilic particles.
Figure 12:
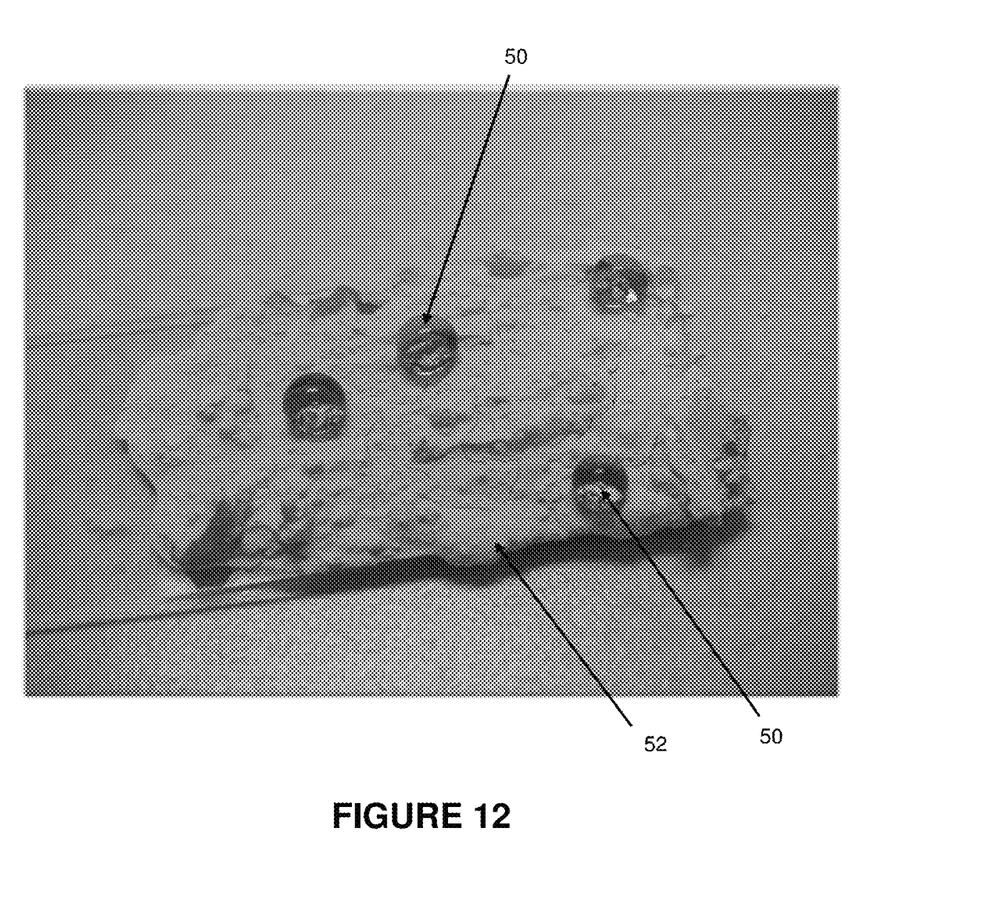
FIG. 12: is a photograph of water droplets on a superhydrophobic paint sample comprising the superolephilic particles according to various embodiments.

Referring to FIG. 11, a superhydrophobic/superoleophilic bulk coating 40 is shown. The particular bulk coating 40, shown in FIG. 11, comprises a paint 48. As discussed above various other materials can be employed instead of the paint 48. For example page 48 could also be any epoxy. The bulk coating 40 also includes a plurality of superoleophilic particles 10. As described throughout the present disclosure, the superoleophilic particles 10 can include a plurality of nano-structured features 17, defining a plurality of nanopores 18. A pinned composition 44 can be pinned within the nanopores 18. The pinned composition 44 can comprise an oil, a solvent, an alcohol, and/or a surfactant. Portions 56 of the nanostructured features 17 can extend beyond the pinned composition 44. The portions 56 of the nanostructured features 17 that extend beyond the pinned composition 44 can form secure attachments to the paint 48. As discussed above, to ensure that portions 56 of the nanostructured features 17 extend beyond the pinned composition 44, the pinned composition 44 can be allowed to evaporate for a time period prior to incorporating the superoleophilic particles 10 into the paint 48.

Still referring to FIG. 11, some or all of the plurality of superoleophilic particles 10 can be completely surrounded by the paint 48, and some or all of the plurality of superoleophilic particles 10 can be partially or completely exposed above a surface 54 of the paint 48. In the case where a portion of a superoleophilic particle 10 extends beyond the surface 54 of the paint 48, the pinned composition 44 can be exposed. The exposed composition 46 can evaporate. Depending on the particular composition of pinned composition 44, the exposed composition 46 can evaporate at different rates.

When the surface 54 of the paint 48 is abraded new superoleophilic particles 10 comprising the pinned composition 44 can be exposed. The subsequently exposed composition 46 can begin to evaporate. More importantly, when the surface 54 of the paint 48 is abraded, some of the nanostructured features 17 can be damaged. The damaged features 42 can retain a shape and configuration relative to other nano structured features 17 to allow the superoleophilic particles 10 to remain superoleophilic/superhydrophobic and to provide a superoleophilic/superhydrophobic characteristic to the bulk coating 40.

Normally, coatings containing oil will leach the oils out fairly quickly over time. But, oils that are pinned within superhydrophobic powder grains have been shown to retain oils over an extended amount of time. The use of oil modified superhydrophobic powder in paints and epoxies constitute a new type of coating material that can to provide exceptional anti-corrosion and anti-fouling behavior. Potential commercial applications of various embodiments include, but are not limited to water resistant paints, epoxies, and composites; anti-biofouling paints and materials; anti-corrosion paints and materials; and watercraft, and piping.

EXAMPLES

In order to assess the performance of the superoleophilic particles and coatings described, superoleophilic coatings were applied to aluminum and radome plates that were submerged in the ocean for up to five weeks. The superoleophilic particles were spinodally decomposed sodium borosilicate glass particles with polysiloxane pinned within the nanopores of the particles, which included a fluorinated SAM hydrophobic coating.

The plates were made superhydrophobic by applying a superhydrophobic coating solution to the plates. The superhydrophobic coating solution contained 3 wt-% superhydrophobic powder (either superhydrophobic diatomaceous earth, superhydrophobic silica nanoparticles, or superhydrophobic spinodal silica powder) with a binder of ~2 wt-% urethane (Clear Coat or PVC cement) in acetone (i.e., ~95 wt-%).

Once the coating solution was dried, the powders were bonded to the plate substrate. At that time a low viscosity polysiloxane oil (500 tSc) was applied to the surface with a dropper. Because of the low viscosity of the polysiloxane oil, it was absorbed into and pinned in the nanopores. Excess oil drain off the surface, which appeared and felt dry. After drying and curing the binder, coated and uncoated aluminum plates were placed in the Atlantic Ocean at the Battelle Emersion Facility in Florida.

FIGS. 7A-D show side-by-side comparisons of coated and uncoated portions of the same metal plate: (a) immediately after coating, (b) after one day of exposure, (c) after one week of exposure, and (d) after two weeks of exposure. Similarly, FIGS. 8A-B show coated and uncoated both (a) prior to washing, and (b) after washing. Finally, FIGS. 9A and B show comparative photographs showing coated and uncoated radome and aluminum surfaces, respectively, after 8 weeks exposure to the ocean. The washing process used for the pictures in FIGS. 8 and 9, included washing with a simple garden hose (estimated water pressure of <200 psi).

Figure 7:
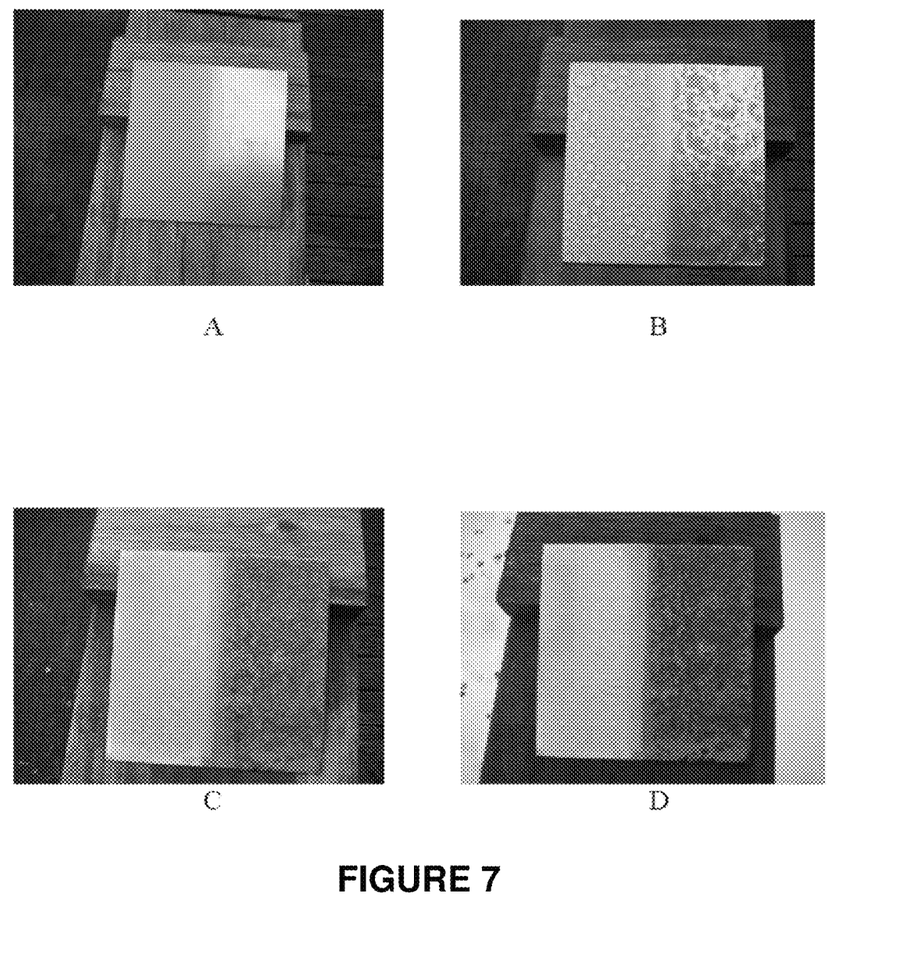
FIGS. 7A-D: are pictures showing comparative result for a fouling experiment (A) immediately after coating, (B) after one day of exposure to the ocean, (C) after one week of exposure to the ocean, and (D) after two weeks of exposure to the ocean.
Figure 8A:
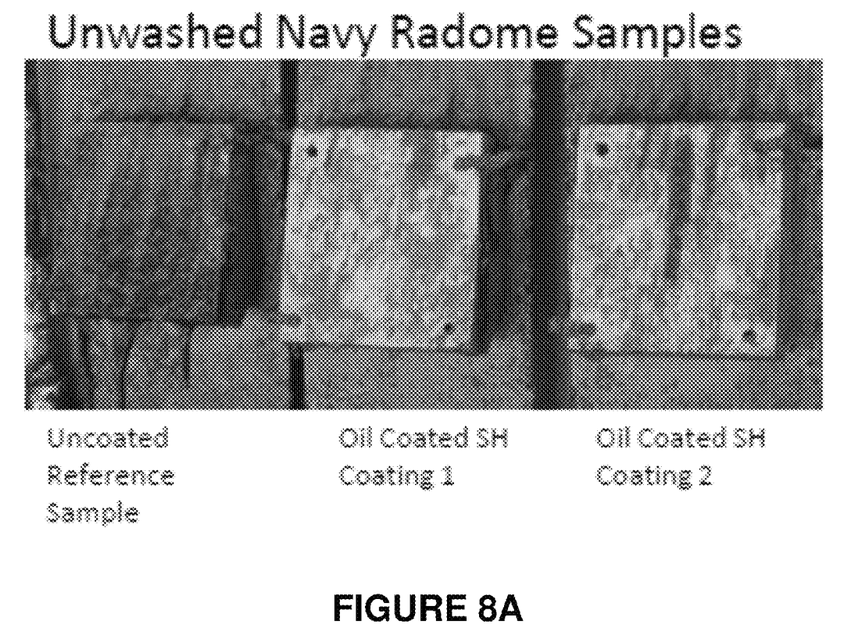
FIGS. 8A-B: are pictures showing comparative results for radome plates with and without the inventive superoleophilic coatings after 5 weeks of exposure to the ocean.
Figure 8B:
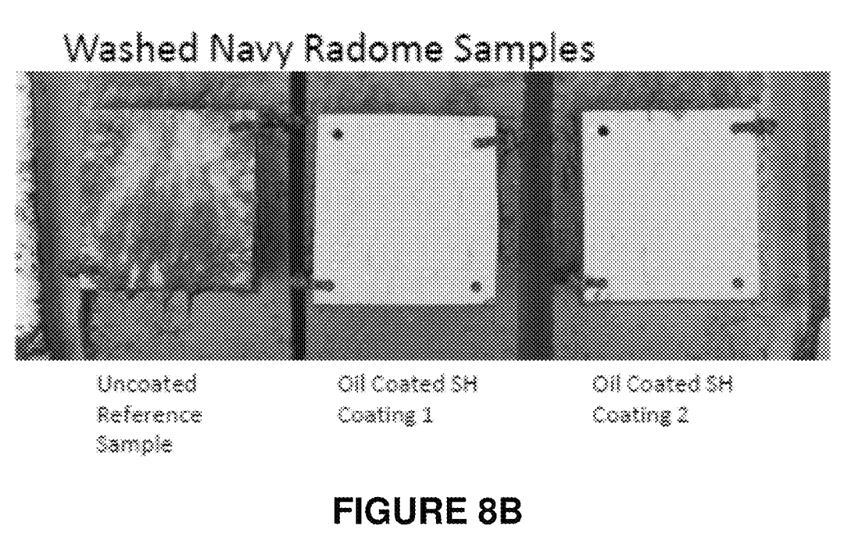
Figure 9:
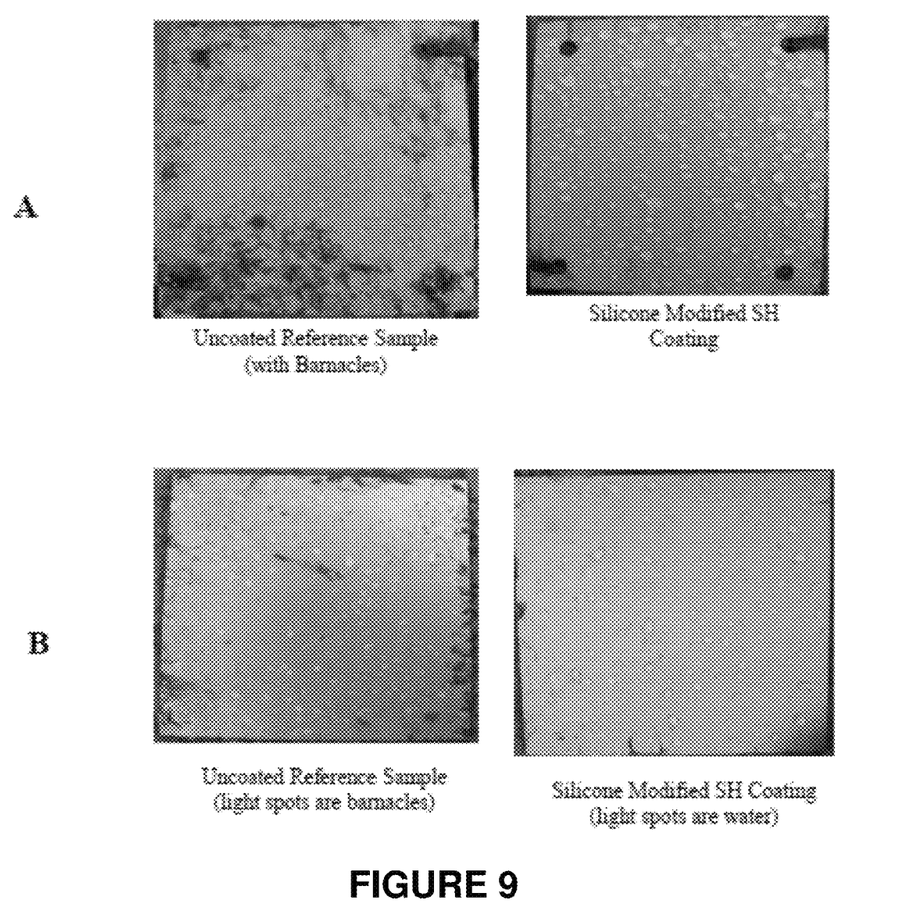

From FIGS. 7-9, it is clear that the superoleophilic coating materials provide exceptions anti-fouling properties. The same features that provide exceptional anti-fouling properties can also provide exceptional self-cleaning properties and anti-corrosion properties.

In some additional experiments, a high viscosity polysiloxane oil (100,000 tSc) was pinned in the nanopores. In these instances, the viscosity of the polysiloxane oil was lowered by adding acetone before applying the oil pinning solution to the superhydrophobic particles. As with the low viscosity polysiloxane oil, the surface appeared and felt dry.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A bulk superhydrophobic coating composition comprising:
   a coating material selected from the group consisting of a paint, an epoxy, and combinations thereof; and
   a plurality of particles, each comprising:
      a porous particle,
         having a particle size ranging from at least 100 nm to about 10 μm, and
         having a plurality of spaced apart nanostructured features comprising a contiguous, protrusive material, and
      a hydrophobic coating layer deposited on the porous particle,
   the plurality of particles comprising:
      a first subset of particles disposed only partially within the coating material, and
      a second subset of particles disposed entirely within the coating material,
   wherein the first subset of particles comprises a first pinned composition pinned within the plurality of spaced apart nanostructured features of each porous particle of the first subset of particles,
   wherein the first pinned composition is selected from the group consisting of a first oil, and a combination of the first oil and a first volatile component,
   wherein the first volatile component is volatile at room temperature,
   wherein the spaced apart nanostructured features of the first subset of particles extend beyond the first pinned composition,
   wherein a first portion of the spaced apart nanostructured features of the first subset of particles that extend beyond the first pinned composition are secured to the coating material, and
   wherein a second portion of the spaced apart nanostructured features of the first subset of particles that extend beyond the first pinned composition extend beyond a surface of the coating material,
   wherein the second subset of particles comprises a second pinned composition pinned within the plurality of spaced apart nanostructured features of each porous particle of the second subset of particles,
   wherein the second pinned composition comprises:
      a second oil, and
      a second volatile component,
   wherein the second volatile component is volatile at room temperature, and
   wherein the spaced apart nanostructured features of the second subset of particles extend beyond the second pinned composition.

2. The bulk superhydrophobic coating composition according to claim 1, wherein said porous particles further comprise an etching residue disposed on said contiguous, protrusive material, said etching residue from a recessive contiguous material interpenetrating with said protruding material.

3. The bulk superhydrophobic coating composition according to claim 2, wherein at least one of said protruding material and said etching residue comprises a glass.

4. The bulk superhydrophobic coating composition according to claim 1, wherein said hydrophobic coating layer comprises a perfluorinated organic material.

5. The bulk superhydrophobic coating composition according to claim 1, wherein said hydrophobic coating layer comprises a self-assembled monolayer.

6. The bulk superhydrophobic coating composition according to claim 5, wherein said pinned composition does not evaporate at ambient environmental conditions.

7. The bulk superhydrophobic coating composition according to claim 1, wherein said porous particles comprise porous diatomaceous earth particles.

8. The bulk superhydrophobic coating composition according to claim 1, wherein said oil comprises a non-nutritional oil.

9. The bulk superhydrophobic coating composition according to claim 1, wherein said oil comprises an oil selected from the group consisting of non-volatile linear and branched alkanes, alkenes and alkynes; esters of linear and branched alkanes, alkenes and alkynes; polysiloxanes, and combinations thereof.

10. The bulk superhydrophobic coating composition according to claim 1, wherein said pinned composition evaporates at ambient environmental conditions.

11. The bulk superhydrophobic coating composition according to claim 1, wherein the first volatile component is selected from the group consisting of methanol, ethanol, and combinations thereof, and wherein the second volatile component is selected from the group consisting of methanol, ethanol, and combinations thereof.

12. The bulk superhydrophobic coating composition according to claim 1, wherein the first volatile component is selected from the group consisting of an alkane, an alkene, an alkyne, and combinations thereof, and
    wherein the second volatile component is selected from the group consisting of an alkane, an alkene, an alkyne, and combinations thereof.

13. The bulk superhydrophobic coating composition according to claim 1, wherein the first volatile component is selected from the group consisting of acetone, hexane, heptane, octane, and combinations thereof, and
    wherein the second volatile component is selected from the group consisting of acetone, hexane, heptane, octane, and combinations thereof.

14. The bulk superhydrophobic coating composition according to claim 1, wherein the coating material is the paint.

15. An article comprising a surface coated with the bulk superhydrophobic coating composition according to claim 1, the article having an initial condition and an abraded condition, wherein the second subset of particles are embedded in the initial condition and exposed in the abraded condition, and wherein the surface is superhydrophobic in the initial condition and in the abraded condition.

* * * * *